United States Patent [19]

Bennion et al.

[11] Patent Number: 4,867,543

[45] Date of Patent: Sep. 19, 1989

[54] SPATIAL LIGHT MODULATOR

[75] Inventors: Ian Bennion, Northampton; Roger W. Whatmore, Buckenhamshire; William J. Stewart, Northants, all of England

[73] Assignee: Plessey Overseas Limited, Ilford-Essex, England

[21] Appl. No.: 155,922

[22] PCT Filed: May 28, 1987

[86] PCT No.: PCT/GB87/00370

§ 371 Date: Mar. 25, 1988

§ 102(e) Date: Mar. 25, 1988

[87] PCT Pub. No.: WO87/07393

PCT Pub. Date: Dec. 3, 1987

[30] Foreign Application Priority Data

May 28, 1986 [GB] United Kingdom ............... 8612912

[51] Int. Cl.$^4$ ..................... G02F 1/055; G02F 1/01
[52] U.S. Cl. ................................. 350/384; 350/356; 350/386; 350/403
[58] Field of Search ............... 350/356, 384, 386, 388, 350/403

[56] References Cited

U.S. PATENT DOCUMENTS

| 3,744,878 | 7/1973 | Kiemle et al. ............... 350/160 |
| 3,806,228 | 4/1974 | Imagawa ..................... 350/150 |
| 4,367,925 | 1/1983 | Sprague et al. .............. 350/356 |
| 4,371,892 | 2/1983 | Mir ........................ 358/75 |
| 4,377,753 | 3/1983 | Mir ........................ 350/388 |
| 4,569,573 | 2/1986 | Agostinelli ................ 350/320 |
| 4,618,819 | 10/1986 | Mourou et al. .............. 350/356 |

FOREIGN PATENT DOCUMENTS

| 0040575 | 11/1981 | European Pat. Off. . |
| 0051356 | 5/1982 | European Pat. Off. . |
| 0077188 | 4/1983 | European Pat. Off. . |
| 58-199326 | 11/1983 | Japan . |
| 60-26320 | 2/1985 | Japan . |
| 86/01613 | 3/1986 | PCT Int'l Appl. . |
| 1550576 | 8/1979 | United Kingdom . |
| 2050638 | 1/1981 | United Kingdom . |

OTHER PUBLICATIONS

S. H. Lee et al., "Two Dimensional Silicon/PLZT Spatial Light Modulators: Design Considerations and Technology" Opt. Eng 25, pp. 250–260 (Feb. 1986).
S. C. Esener et al. "One Dimensional Silicon/PLZT Spatial Light Modulators" Opt. Eng. 26 pp. 406–413 (May 1987).
Optical Engineering, vol. 25 No. 2 (Feb. 1986) Soc. of Photo-Optical Instrumentation Engineers, S. H. Lee et al., "Two-Dimensional Silicon PLZT Spatial Light Modulators: Design Considerations and Technlogy", pp. 250–260.
Xerox Disclosure Journal, vol. 3, No. 1, Jan./Feb. 1978 (New York, U.S.) D. L. Camphausen, "Electron Beam Display Target Using Edge Mode Effect" pp. 59–60.
Patent Abstracts of Japan, vol. 9, No. 148 (P-366)(1871) Jun. 22, 1985.
Patent Abstracts of Japan, vol. 8, No. 48 (p. 258)(1485) Mar. 3, 1984.

Primary Examiner—Bruce Y. Arnold
Assistant Examiner—R. D. Shafer
Attorney, Agent, or Firm—Fleit, Jacobson, Cohn, Price, Holman & Stern

[57] ABSTRACT

A modulator of the type including an array of light modulating elements. To afford fast response and thus greater modulation bandwidth these elements, each comprising a pair of electrodes and a reflector, are defined in a sheet layer of electro-optic solids material. In particular, this material may be of PLZT ceramics material or of a similar ceramic having a high electro-optic coefficient (quadratic). To advantage, the electrodes may be embedded in the sheet layer. Each modulating element is aligned with and connected to a corresponding drive circuit, part of an integrated circuit structure. Conveniently, solder bumps are used to this end.

Light is directed onto the array of modulating elements by an optical interface. This may comprise an array of micro-lenses which too may be aligned by solder bumps. A second reflector may be added to each modulating element, each then being optically resonant.

9 Claims, 2 Drawing Sheets

SPATIAL LIGHT MODULATOR

TECHNICAL FIELD

The present invention concerns improvements in or relating to spatial light modulators. Such modulators comprise an array of individual modulating elements each of which modifies incident light to provide overall spatial modulation in amplitude, polarization, or phase. These devices have application, for example, to image processing, optical signal processing, page composition for optical data storage, and electrical chip-to-chip interconnection.

BACKGROUND ART

Of spatial light modulators considered to date, those of the liquid crystal light valve type appear to have been the most promising. In devices of this type, a layer of liquid crystal material is retained between two electrode coated substrates. One of the electrode coatings is patterned to provide an array of individually addressable electrode elements each corresponding to a cell of the liquid crystal medium. In one common construction, the liquid crystal material is of the nematic type and the molecules are aligned in a twisted formation—each cell thus behaves as a twisted nematic (Schadt-Helfrich) light valve when combined with a sheet polarizer. Useful application of these devices is however limited by the relatively slow response of the liquid crystal media to applied voltage. Modulation bandwidths up to a maximum of a few MHz only have been reported.

DISCLOSURE OF THE INVENTION

The present invention is intended to provide an alternative construction for spatial light modulators, in particular a construction capable of faster response and thus offering wider modulation bandwidth.

In accordance with the invention thus there is provided a spatial light modulator comprising: a sheet layer of solid electro-optic material having at one surface thereof an array of parallel paired electrode elements, and, having at the other surface thereof first light reflecting means: an integrated circuit array of individual driver circuits, each circuit aligned with, and connected to, a corresponding pair of the element electrodes aforesaid; and, optical interface means arranged relative to the sheet layer to direct polarized light onto each array element.

It is convenient to employ, as solid materials, an electro-optic ceramic material. Lead-doped lanthanum zirconate titanate (PLZT) ceramic material, in particular, are preferred, these being readily available, relatively inexpensive and easy to prepare. These materials exhibit exceptionally high electro-optic coefficients (quadratic effect) and thus promise to provide efficient modulating media.

The paired electrodes aforementioned, at one surface of the sheet layer, may be deposited thereon Alternatively, and to provide improved efficiency, these electrodes may be embedded in this one surface, providing thus a more effective localization and concentration of electric field when voltage is applied.

Preferably, the sheet layer and integrated circuit array are both rigid and thus self-supporting, the array circuits and array elements then being aligned and interconnected by matching arrays of solder bumps.

Conveniently, the optical interface means may comprise a micro-lens array. This likewise may be aligned with the array elements by means of further matching arrays of solder bumps. Alternatively, the optical interface means may be provided by an array of optical fibers.

The principal advantage of the invention, that of faster response, is inherent in the use of electro-optic solids materials. This and other advantages of the invention and preferred embodiments will be apparent from the description that follows hereinafter.

BRIEF INTRODUCTION OF THE DRAWINGS

In the drawings accompanying this specification:

DESCRIPTION OF PREFERRED EMBODIMENTS

So that this invention may be better understood, embodiments thereof will now be described and reference will be made to the accompanying drawings. The description that follows is given by way of example only.

Figure 1:
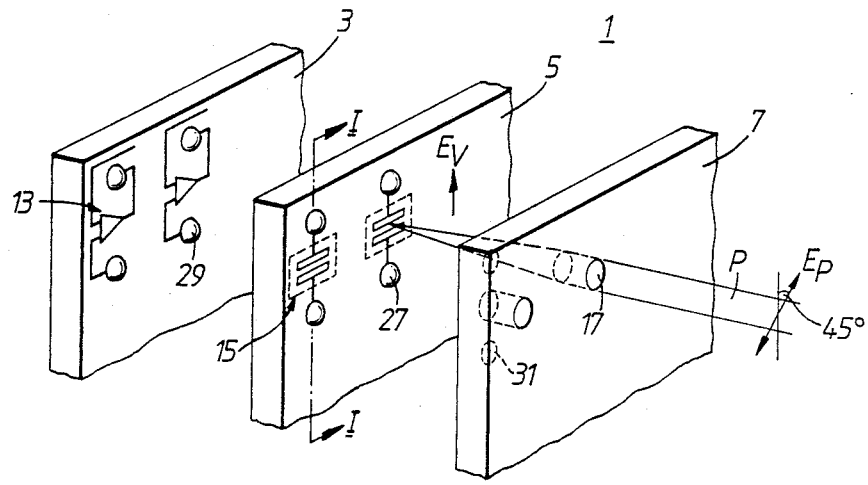
FIG. 1 is an exploded perspective view of a spatial light modulator constructed in accordance with this invention.

With reference to FIG. 1 a spatial light modulator 1 is shown and this comprises an electronic integrated circuit structure 3, an electro-optic modulator array 5 and an optical interface 7, here a means of focusing light, for example, a microlens array formed by eg. silver ion-exchange in a soda-lime glass. The function of the device may be described with reference to one of many identical cell elements of the array, i.e. one drive circuit 13 from the electronic integrated circuit structure 3, one modulator element 15 from the modulator array 5 and one lens 17.

Figure 2:
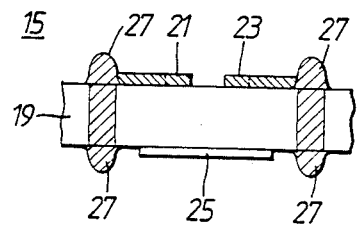
FIG. 2 is a cross-section of an electro-optic modulating element taken along section I—I of FIG. 1 preceding.

Consider first the electro-optic modulator element 15 (FIG. 2). This comprises a sheet layer 19 of electro-optic solid material with a pair of parallel spaced electrodes 21, 23 deposited upon one surface. It functions conventionally using the linear or quadratic electro-optic effect to phase-shift a polarized incident light beam P. For example, in the present invention the use of the quadratic effect in the ceramic material of the lead-lanthanum-zirconate-titanate (PLZT) system is favorable and in this case the incoming light P is arranged to be polarized in a direction of 45° to the direction of the electric field $E_V$ produced by the modulator electrodes 21, 23. This may be accomplished by positioning a polarizer (not shown) oriented in this direction before entry to the modulator 1. Application of a voltage leads to negatively uniaxial birefringence in the direction of the applied field $E_V$ and so, as is well known, to phase modulation of the light passing through the material 19 in the region of applied field $E_V$. In the present invention, light reflects from a mirror or dielectric reflector 25 deposited on or attached to the modulator layer 19 after one pass through the material 19 and returns along its incident path during which it accumulates a further phase modulation. The phase modulation is reproduced as an amplitude modulation by the return passage through the polarizer. The polarizer may be positioned before or after the lens array 7. The function of each lens 17 is to focus incident parallel light P into the modulator aperture and to collimate the returning modulated light.

The metal electrodes 21, 23 can be applied to the surface of the sheet layer 19 by standard photolithographic procedures and connected as shown in FIG. 1 to solder bumps 27. The electrical drive circuit 13 is similarly terminated on the planar electronic circuit structure 3 in solder bumps 29 of matching spacing. This solder bump technique permits both electrical connection between the electrical drive circuits 13 and the modulator electrodes 21, 23 and auto-alignment of the modulator array 5 to the electrical planar device 3. The drive voltages for the modulator elements are thereby derived from the electrical integrated circuit 3. Similar solder bumps 31 may be used to align and attach the microlens array 7 to the modulator array 5. The solder bumps 27 on each surface of the sheet layer 19 are interconnected by means of solder-filled via holes 33.

The speed and operating voltage of this device 1 are determined by (i) the modulator material response time and electro-optic coefficient, (ii) the aperture dimensions, (iii) the electrode capacitance, (iv) the properties of the electrical drive circuits. Using 9/35/65 PLZT, with 2 $\mu$m electrode separation, a phase retardation of PI radians at 633 nm optical wavelength can be achieved by application of approx. 20 Volts. This would correspond to 100% amplitude modulation. In many cases 100% modulation is not required and the voltage can be reduced accordingly. Compatibility with the working voltage limit of the planar electrical circuit technology utilized must also be taken into account. One realization of this invention would utilize silicon bipolar or MOS technology although the invention is compatible with other technologies, eg. gallium arsenide GaAs. The capacitance of the planar electrodes 21, 23 with 2 $\mu$m gap is approximately 23 pF.mm$^{-1}$. For electrode length 10 $\mu$m, excluding bonding pad capacitance, this yields for 50 ohms electrodes a bandwidth of approximately 25 GHz. The ultimate switching speed of PLZT is known to be faster than 1 GHz and has been estimated to be greater than 20 GHz.

Alternative modulator materials are known which have either demonstrated or predicted faster response times which too would be compatible with the present invention.

Figure 3:
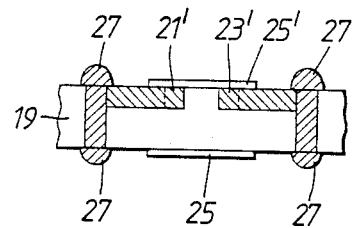
FIG. 3 is a cross-section also of an electro-optic modulating element, a variant of that shown in the previous figure; and, FIG. 4 is a schematic illustration of a modulator system, a system incorporating the modulator shown in FIG. 1 above, together with a polarization selective beamsplitter.

The efficiency of the modulator described (i.e. phase change/unit voltage) is ultimately limited also by the depth of electric field penetration into the material available from surface electrodes and by the nonuniformity of the internal field. Both of these factors can be improved by dispensing with planar electrodes 21, 23 by instead milling slots in their places and depositing metal electrodes 21', 23' in the slots so-produced (see FIG. 3).

Modulator efficiency may be further enhanced for some applications by configuring each modulator element 15 as part of an optical resonator. This may be achieved, for example, by depositing dielectric reflectors 25, 25' on the opposite surfaces of the sheet layer 19 (see FIG. 3).

Figure 4:
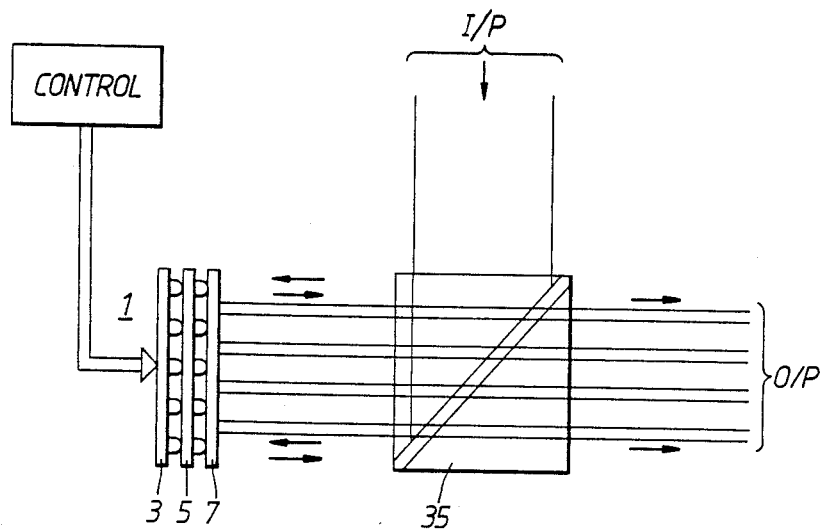

FIG. 4 shows one arrangement whereby the construction shown in FIG. 1 above is used as a multichannel spatial light modulator. Electrical signals applied to the electrical circuits produce modulator voltages which in turn, produce amplitude- or intensity-modulated outputs in the channels of the array. The polarizer in this case is a polarization-selective beamsplitter 35. This also serves as an analyzer. The function is, therefore, to produce a two-dimensional array of independently modulated light beams with fast response time.

Polarized light and a non-selective beamsplitter alternatively, could be utilized. The light output by the modulator thus is then phase- but not amplitude-modulated. In place of an analyzer, the output channel light may then be added to a reference beam to result in amplitude modulation.

We claim:

1. A spatial light modulator comprising: a solid sheet layer of electro-optic material having on one surface thereof an array of elements each including parallel paired electrodes and having on the other surface thereof a first light reflecting means; a integrated circuit array of individual driver circuits lying in a plane parallel to the solid sheet layer and juxtaposed to said other surface of said solid sheet layer with each individual driver circuit aligned with, and connected to, the parallel paired electrodes of a corresponding array element and, optical interface means arranged relative to the sheet layer to direct polarized light onto each array element.

2. A modulator, as claimed in claim 1, wherein the solid sheet layer is of electro-optic ceramic material.

3. A modulator, as claimed in claim 2, wherein the ceramic material is lead-doped lanthanum zirconate titanate.

4. A modulator, as claimed in claim 1, wherein the paired electrodes of each array element are embedded in the surface of the solid sheet layer material.

5. A modulator, an claimed in claim 1, wherein the connection between the integrated circuit array and the array of elements is effected by means of matching arrays of solder bumps.

6. A modulator, an claimed in claim 1, wherein the optical interface means comprises a micro-lens array.

7. A modulator, as claimed in claim 6, further including matching arrays of solder bumps to align and superimpose the array of elements and the micro-lens array.

8. A modulator, as claimed in claim 1, wherein a second light reflecting means is provided at said one surface of the sheet layer for forming an array of optically resonant elements.

9. A modulator, as claimed in claim 1 further including a polarization selective beam splitter arranged adjacent to the optical interface means.

* * * * *